(12) United States Patent
Chamayou et al.

(10) Patent No.: US 9,394,381 B2
(45) Date of Patent: Jul. 19, 2016

(54) POLYMERISATION CONTROL PROCESS

(75) Inventors: Jean-Louis Chamayou, Carry le Rouet (FR); Daniel Marissal, Sausset les Pins (FR)

(73) Assignee: INEOS SALES (UK) LIMITED, Lyndhurst, Hampshire (GB)

(*) Notice: Subject to any disclaimer, the term of this patent is extended or adjusted under 35 U.S.C. 154(b) by 504 days.

(21) Appl. No.: 13/885,375

(22) PCT Filed: Nov. 16, 2011

(86) PCT No.: PCT/EP2011/070280
§ 371 (c)(1),
(2), (4) Date: May 14, 2013

(87) PCT Pub. No.: WO2012/072417
PCT Pub. Date: Jun. 7, 2012

(65) Prior Publication Data
US 2013/0245220 A1    Sep. 19, 2013

(30) Foreign Application Priority Data
Nov. 29, 2010    (EP) .................................... 10192990

(51) Int. Cl.
*C08F 2/34* (2006.01)
*C08F 10/00* (2006.01)
*B01J 8/44* (2006.01)

(52) U.S. Cl.
CPC . *C08F 2/34* (2013.01); *C08F 10/00* (2013.01); *C08F 2400/02* (2013.01); *Y02P 20/582* (2015.11)

(58) Field of Classification Search
CPC ............................... C08F 2/34; C08F 2400/02
USPC ............................................................ 526/88
See application file for complete search history.

(56) References Cited

U.S. PATENT DOCUMENTS

| 4,588,790 A † | 5/1986 | Jenkins |
| 5,126,414 A | 6/1992 | Cooke et al. |
| 5,733,510 A | 3/1998 | Chinh et al. |
| 5,804,677 A * | 9/1998 | Chinh .................... B01J 8/1809 526/352 |

FOREIGN PATENT DOCUMENTS

| EP | 0 241 947 A2 | 10/1987 |
| EP | 1 556 415 B1 | 12/2009 |
| GB | 1398965 † | 6/1975 |
| WO | WO 94/28032 A1 | 12/1994 |
| WO | WO 98/16562 A1 | 4/1998 |
| WO | WO 02/40554 A1 | 5/2002 |
| WO | 03/054036 † | 7/2003 |
| WO | 2008/108913 † | 9/2008 |

* cited by examiner
† cited by third party

*Primary Examiner* — Fred M Teskin
(74) *Attorney, Agent, or Firm* — Nixon & Vanderhye P.C.

(57) ABSTRACT

Process for maintaining a continuous gas-phase (co-) polymerization of olefins in a large fluidized bed reactor in a homogeneous mode while operating at high space time yield and condensation rate in the presence of a polymerization catalyst.

46 Claims, 2 Drawing Sheets

POLYMERISATION CONTROL PROCESS

This application is the U.S. national phase of International Application No. PCT/EP2011/070280 filed 16 Nov. 2011 which designated the U.S. and claims priority to European Patent Application No. 10192990.9 filed 29 Nov. 2010, the entire contents of each of which are hereby incorporated by reference.

The present invention relates to a process for controlling the gas-phase co-polymerisation of olefins in a large fluidised bed reactor.

The present invention further relates to a process for maintaining a continuous gas-phase (co-) polymerisation of olefins in a large fluidised bed reactor in a homogeneous mode whilst operating at high space time yield and condensation rate in the presence of a polymerisation catalyst.

The present invention further relates to a method for the continuous gas-phase (co-) polymerisation of olefins in a large fluidised bed reactor operating at high space time yield and condensation rate in the presence of a polymerisation catalyst wherein the variable DT of the fluidised polymer bed is controlled in order to maintain the fluidised bed reactor in a homogeneous mode.

The present invention further relates to a method for the continuous gas-phase (co-) polymerisation of olefins in a large fluidised bed reactor operating at high space time yield and condensation rate in the presence of a polymerisation catalyst wherein the liquid injection is controlled in order to maintain the fluidised bed reactor in a homogeneous mode.

BACKGROUND OF THE INVENTION

Processes for the co-polymerisation of olefins in the gas phase are well known in the art. Such processes can be conducted for example by introducing the gaseous monomer and comonomer into a gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the polymer particles become too sticky and the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent such as nitrogen and/or one or more alkanes (e.g. one or more of propane, butane, pentane, hexane, heptane, octane) and/or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

The man skilled in the art knows that some liquid could advantageously be used in the polymerisation fluidised bed technology in order to assist in the heat removal within the polymer bed and correspondingly increase the production rate. This can be operated by cooling the recycle gas below its dew point so that liquid is introduced into the reactor through the recycle process.

For example, in EP89691 and EP0241947, an inert liquid may be introduced into the recycle stream to increase its dew point. The resulting ability to remove greater quantities of heat energy in less time has increased the production capacity of the typical exothermic fluidised bed reactor. It is recited that the entry point for the two-phase recycle stream should be below the fluidised bed (polymerisation zone) to ensure uniformity of the upwardly flowing gas stream and to maintain the bed in a suspended condition. It is also recited that no noticeable temperature gradient appears to exist within the upper portion of the bed whilst a temperature gradient will exist in the bottom of the bed in a layer of about 6 to 12 inches, between the temperature of the inlet fluid and the temperature of the remainder of the bed.

WO9428032 discloses the separation of at least part of the condensed liquid from the recycle gaseous stream and its introduction directly into the fluidised bed at or above the point at which the gaseous stream passing through the fluidised bed has substantially reached the temperature of the gaseous stream being withdrawn from the reactor. Point or points of introduction of the liquid into the fluidised bed located at approximately 50-70 cm above the fluidisation grid are recommended.

It recites that commercial processes for the gas fluidised bed polymerisation of olefins are generally operated under substantially isothermal, steady state conditions. However, although at least a major portion of the fluidised bed is maintained at the desired substantially isothermal polymerisation temperature, there normally exists a temperature gradient in the region of the bed immediately above the point of introduction of the cooled recycle gaseous stream into the bed. The lower temperature limit of this region wherein the temperature gradient exists is the temperature of the incoming cool recycle gas stream, and the upper limit is the substantially isothermal bed temperature. In commercial reactors of the type which employ a fluidisation grid, this temperature gradient normally exists in a layer of about 15 to 30 cm (6 to 12 inches) above the grid.

In WO9425495, WO9425497, WO9610590 and WO9610591 ("Dechellis"), whilst it is claimed that higher condensation rates can be obtained, it is also recited that fluidised bulk density (FBD), and particularly the ratio of fluidised bulk density to settled bulk density (SBD), are asserted to be limiting factors for stable operation where higher quantities of liquid are used in the recycle stream. The entry point for the recycle stream is said to be preferably below the fluidized bed so as to provide a uniform flow of the recycle stream to maintain the fluidized bed in a suspended condition and to ensure uniformity of the recycle stream passing upwardly throughout the fluidized bed.

Some of the examples disclosed in WO9425495 show very high condensation rates obtained thanks to the control of the ratio of fluidised bulk density to settled bulk density, the polymerisation process being otherwise operated under conventional operations, i.e. including the recycling of the gas/liquid flow below the fluidisation grid.

U.S. Pat. No. 6,391,985 discloses a method of achieving and utilizing a high percentage of liquid in the recycle by deliberately adjusting the conditions in the reactor to pass from the bubbling mode of fluidization to turbulent fluidization and increasing the condensing level (the amount of liquid introduced through recycle) to a desired level of 17.5% or higher, preferably 20% or higher.

It is also recommended therein to utilize a ratio of fluidized bulk density to settled bulk density (FBD/SBD) less than 0.59, i.e. exactly the opposite teaching compared to Dechellis.

SUMMARY OF THE INVENTION

Despite the existence of a great number of publications claiming the control of gas phase polymerisation reactors operating under high condensation levels, there is still a need for the man skilled in the art to develop simple methods allowing to produce polymers commercially at very high capacity and important condensation levels, under stable and reliable conditions. Indeed, most of the examples disclosed in the art summarized hereinabove are in fact based either on extrapolations, computer simulations and/or under conditions which are not representative of true commercial operations. Real life commercial operations are highlighting important limitations to the prior art, as evidenced e.g. in WO2009096937 which is broadly directed to various methods and systems for detecting liquid pooling in reactor systems, such as, for example, a polymerization gas-phase reactor system. It recites that excessive amount of condensation can lead to liquid pooling in the bottom head of the reactor, the area below the distributor plate. Such liquid pooling is often a "cloud" or mist of minute liquid droplets suspended in the gas phase, and can reach thousands of pounds of suspended liquid. This liquid pooling can lead to fluidized bed instability problems. For example, a drop in the condensing agent concentration in the cycle gas results in reduced heat removal efficiency which may lead to temperatures exceeding the polymer melt point.

Also, WO2009096937 explicitly acknowledge the problems associated with increased condensation rates by reciting that "Therefore, there is a need in the polymer industry for alternative methods of operation to increase production rates from polymerization reactions other than by continuing to increase the amount of condensable component in the cycle gas".

In the course of their continuous developments, the Applicants have found that the use of certain more stringent process operating conditions, including e.g. high space-time yield and high condensation rates in high capacity commercial polymerisation gas phase reactors, in particular in large diameter reactors, can cause the polymer bed to behave less homogeneously; non homogeneous polymer bed behaviour can cause significant operating problems which could lead in an extreme case, to the shutdown of the operations. Indeed, the operability of a gas phase fluid bed polyolefin process can easily be compromised by the formation of agglomerates and/or wall sheeting when the correct window of operating parameters and fluid bed homogeneity are not achieved. Hot spots in the reactor are often the indication that the reactor has a heterogeneous behaviour and are also either the signal or the cause of lump formation, which will eventually disturb fluidization, with plant shutdown as a consequence.

The Applicants have then found a process for successfully controlling the gas-phase co-polymerisation of olefins in a large fluidised bed reactor under such stringent process operating conditions.

In particular, the Applicants have found a process for maintaining a continuous gas-phase (co-) polymerisation of olefins in a large fluidised bed reactor in a homogeneous mode whilst operating at high space time yield and condensation rate in the presence of a polymerisation catalyst.

The present invention further relates to a method for the continuous gas-phase (co-) polymerisation of olefins in a large fluidised bed reactor operating at high space time yield and condensation rate in the presence of a polymerisation catalyst wherein the variable DT of the fluidised polymer bed is controlled in order to maintain the fluidised bed reactor in a homogeneous mode.

The present invention further relates to a method for the continuous gas-phase (co-) polymerisation of olefins in a large fluidised bed reactor operating at high space time yield and condensation rate in the presence of a polymerisation catalyst wherein the liquid injection is controlled in order to maintain the fluidised bed reactor in a homogeneous mode.

The present invention is applicable to high capacity commercial polymerisation gas phase reactors.

BRIEF DESCRIPTION OF THE DRAWINGS

The invention will now be further described with reference to the accompanying drawings, in which.

DETAILED DESCRIPTION OF EMBODIMENTS

Fluidized-bed reactors according to the present invention can be represented by a first volume, the enclosure (wall) of which consists of at least one surface of revolution generated by the rotation around a vertical axis known as axis of revolution, of a rectilinear and/or curved segment, above which is preferably mounted a second volume, commonly called a disengagement vessel, the enclosure (wall) of which also consists of at least one surface of revolution generated by the rotation, around the same vertical axis known as axis of revolution, of a rectilinear and/or curved segment. According to its definition of disengagement vessel, the orthogonal section of the second volume (at the location situated just above the junction between the two volumes) is higher than the orthogonal section of the first volume (at the location situated at its upper point).

Figure 1:
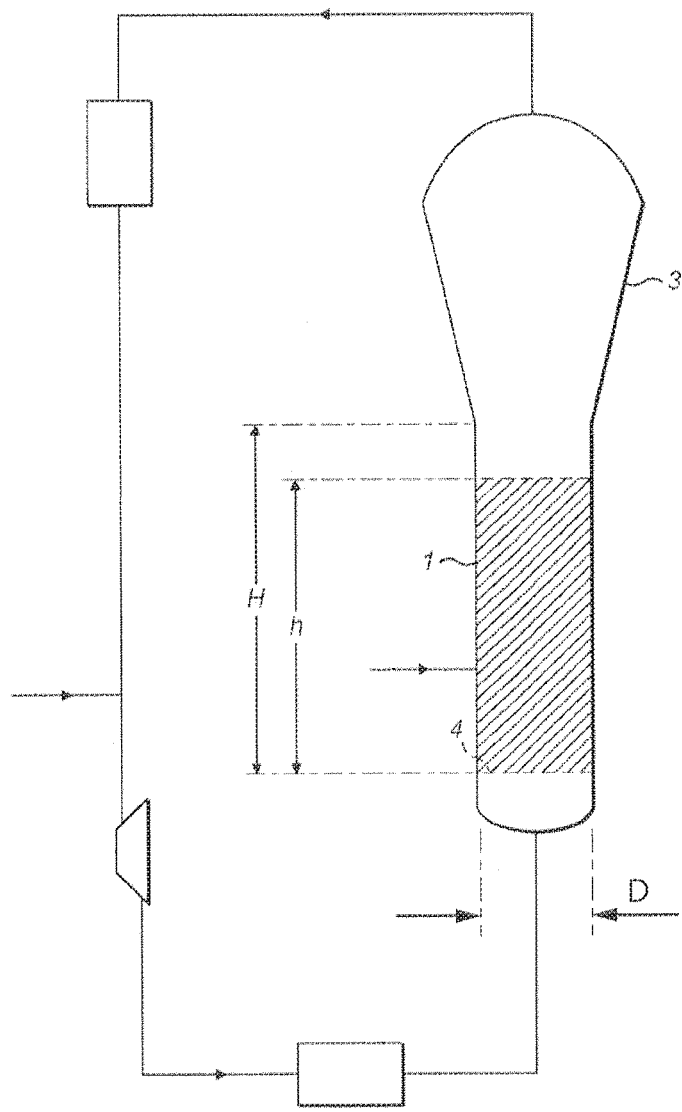
FIG. 1 shows diagrammatically a preferred apparatus for the gas phase polymerization according to the present invention.

Conventional fluidized-bed reactors employed for the gas phase polymerization of olefin(s) usually consist of a cylinder (1) of diameter "D" and height "H" with a vertical axis above which is preferably mounted a disengagement vessel (3) in accordance with FIG. 1, which shows diagrammatically a preferred apparatus for the gas phase polymerization according to the present invention.

The known essential function of the disengagement vessel is to slow down the rising gas stream which, after having passed through the fluidized bed, can entrain relatively large quantities of solid particles. As a result, most of the entrained solid particles return directly into the fluidized bed. Only the finest particles can be entrained out of the reactor.

In principle, the fluidized bed could occupy all of the cylindrical part of the reactor, a part which rises over a height H starting from the base of the fluidized bed, which generally coincides with the fluidization grid (4). In practice the fluidized bed generally can occupy only a portion of the cylindrical part of the fluidized-bed reactor, with the result that the real height of the fluidized bed (h) is equivalent to 0.85×H, preferably 0.90×H, and in particular 0.95×H; the fluidized bed may also occupy at least partially the second volume of the reactor, e.g. a real height of the fluidised (h) bed equivalent to H, or 1.05×H, or 1.10×H, or even 1.15×H. The real height of the fluidised bed (h) may also vary during the polymerisation process, e.g. with fluctuations preferably remaining within ranges made by any of the above indicated values. Nucleonic level control on the fluidised bed itself ensures accurate control of the bed height, reducing the possibility of undetected increases in bed height. Such systems are well-known, for example as supplied by Berthold Technologies GmbH & Co KG, Germany, or Ohmart/VEGA Corporation, US.

Within the context of research related to the increase in the output efficiency of its industrial plants for gas phase polymerization of olefins, the Applicants have identified that the use of stringent operating conditions with large diameter reactors, can cause the polymer bed to behave in a non homogeneous mode with significant resultant operational problems.

Thus, the present invention relates to a process for the continuous gas-phase (co-) polymerisation of olefins in a vertical fluidised bed reactor having a first volume of at least 250 m³, said process being operated with a condensation rate higher than 15 wt %, in the presence of a polymerisation catalyst and with a space time yield equal or higher than 120 kg/(m³×h), and characterised in that the operations are controlled in order to maintain the polyolefin fluidised bed under homogeneous conditions.

In particular, the present invention relates to a process for the continuous gas-phase (co-) polymerisation of olefins in a vertical fluidised bed reactor having a first volume of at least 250 m³, said process being operated with a condensation rate higher than 15 wt %, in the presence of a polymerisation catalyst and with a space time yield equal or higher than 120 kg/(m³×h), and characterised in that the operations are controlled in order to maintain the parameter DT below 2.5, wherein $$DT = (1 - 0.016 * Z * X) * \frac{K * STY * H * \text{Heat } Polym}{3600 * Vf * Rho\ PE * Cp\ PE}$$

where:
Z is the condensation rate expressed in wt %,
X is the weight ratio between the liquid introduced directly in the fluidised bed above the fluidisation grid and the total liquid introduced into the reactor,
K is a dimensionless calibration factor equal to 1.46,
STY is the Space Time Yield expressed in [kg/(m³×h)], H is the distance between the bottom of the fluidised bed and the top of the first volume of the reactor (expressed in meter),
Heat Polym is the heat of polymerisation expressed in Kcal/kg Polymer
Vf is the fluidization velocity of the fluidising gas (expressed in m/s),
Rho PE is the polymer powder density expressed in Kg/m³, and
Cp PE is the heat capacity of the solid polymer expressed in Kcal/kg·C.

Thus, for the purpose of the present invention and appended claims,

Z is the condensation rate expressed in wt %; Z is well known by the man skilled in the art as explained in the introductory part of this description;

STY, the Space Time Yield expressed in [kg/(m³×h)], is also well known and represents the weight of polymer produced per unit of time and per unit of Reactor Volume. The Reactor Volume is calculated as 3.1416*D²*H*¼ (in m³), wherein D is the reactor Diameter (D expressed in m). The weight of polymer production per unit of time is calculated as the average steady (co)monomers feed rate (ignoring therefore the slight fluctuations due to (co)monomers losses, e.g. purges);

H is the distance between the bottom of the fluidised bed (e.g. the fluidisation grid) and the top of the first volume (e.g. the top of the cylindrical section) of the reactor (expressed in meter);

Heat Polym is the heat of polymerisation expressed in Kcal/kg Polymer. For the calculation of the DT parameter of the present invention and appended claims, the value used of the "Heat Polym" (in Kcal/kg Polymer) is respectively
    921 for a homopolymer of ethylene (HP-C2)
    591 for a homopolymer of propene (HP-C3)
    461 for a homopolymer of butene (HP-C4)
    338 for a homopolymer of pentene (HP-C5)
    236 for a homopolymer of hexene (HP-C6)
    200 for a homopolymer of heptene (HP-C7)
    150 for a homopolymer of octene (HP-C8)
For copolymers combining two or more of the above mentioned monomers, the Heat Polym used for calculating the DT parameter equals $$0.01 * \Sigma(HP\text{-}Ci * Ci)$$

wherein Ci is the concentration in wt % of the monomer "i" incorporated in the final polymer. Said concentration Ci is preferably measured by carbon-13 NMR spectroscopy ($^{13}$C NMR).

Vf is the fluidization velocity of the gas in free reactor section (expressed in m/s). By free reactor section, the Applicants mean that it assumes that there is no powder in the reactor and that the value is measured at polymerisation temperature and pressure. Said Vf is advantageously calculated by dividing the recycle gas flow rate (Q in m³/h) by the reactor section (S in m²) wherein
    Q can be measured by any appropriate method, e.g. by using a flow meter located on the recycle loop before the (first) heat exchanger—the man skilled in the art knows how to correct said measured flow rate into the actual flow rate, i.e. by taking into account the temperature and pressure conditions inside the reactor (in the centre of the reactor, at the height "H"), and
    S=3.1416*D²/4 wherein D is the reactor Diameter (D expressed in m);

Rho PE is the polymer powder density expressed in Kg/m³ and measured according to the standard ISO 1183-2 (August 2004) "Method D" (i.e. Method by immersion, for solid plastic (column gradient)); and Cp PE is the heat capacity of the solid polymer expressed in Kcal/kg·C. For the calculation of the DT parameter of the present invention and appended claims, the value used for Cp PE is respectively 0.5 for ethylene (co-)polymers, and for other copolymers, Cp PE can be obtained according to ASTM D3418-08 (Standard Test Method for Transition Temperatures and Enthalpies of Fusion and Crystallization of Polymers by Differential Scanning calorimetry).

The vertical fluidized-bed reactors employed in the present inventions usually consist of a first volume in the form of a cylinder of diameter "D" and height "H" as depicted in FIG. 1, said height H starting from the base of the fluidized bed (at the fluidisation grid level). Thus, the present invention particularly relates to the vertical cylindrical fluidized-bed reactors for which "$3.1416*D^2*H/4$" is at least 250 m³.

For example, the first volume as defined hereinabove of the vertical fluidised bed reactor may be at least 270 m³, or even at least 300 m³.

In practice the fluidized bed itself generally can occupy at least 80% of the first volume, e.g. at least 90% of the first volume or even the whole first volume; it may also occupy at least partially the second volume of the reactor, e.g. a portion of the disengagement vessel. Thus, the fluidized bed may have a total volume higher than the first volume, e.g. 105%, 110% or even 120% or more of the first volume.

The volume of the fluidised bed may also vary during the polymerisation process, e.g. with fluctuations preferably remaining within ranges made by any of the above indicated values, e.g. between 80% and 120% of the first volume, preferably between 90% and 110% of the first volume.

It will also be apparent for the man skilled that he can apply the benefits of the present invention to vertical fluidised beds which consist only in a vertical cylinder, i.e. in the absence of disengagement vessel. In such specific configuration, the first volume as defined herebove becomes the sole volume of the reactor and the fluidised itself generally occupy less than 90% of the reactor volume, e.g. between 70 and 85% of the volume of the cylindrical reactor.

In such specific configuration, the value of H (distance between bottom of fluidised bed and top of cylindrical section—just below the dome, if any) used in the present invention, appended claims and especially the DT formula, must be multiplied by a factor of 0.775.

The diameter D of the first volume as defined hereinabove is preferably of at least 4 meters, e.g. at least 4.3 meters, or even at least 4.5 meters, in particular at least 4.75 meters, or even at least 4.90 meters.

Whilst the present invention together with all its embodiments is theoretically applicable to much larger diameter reactors, it is particularly applicable to reactors having a diameter lower than 6 meters, or even lower than 5.5 meters.

For the reactors which are not perfectly cylindrical, the diameter D corresponds to the average diameter of the first volume.

For the reactors which have a grid which is not totally horizontal, the height H is measured from the lower point of the bed and/or grid.

Thus, the Applicants have experienced that with the reactor geometry and under more extreme process operating conditions like e.g. high STY and high condensation rates, the behaviour of the fluidised bed can drastically change as evidenced e.g. by a much less homogeneity of the temperature across the fluidised polymer bed.

According to a preferred embodiment of the present invention, the ratio HID of the reactor first volume is higher than 3.75, e.g. higher than 3.90.

According to another preferred embodiment of the present invention, the ratio HID of the reactor first volume is lower than 5, preferably lower than 4.5, e.g.; lower than 4.20.

As explained hereinbefore, the man skilled in the art believed that the temperature of the fluidised polymer bed is very homogeneous in the region situated about 30 cm above the fluidisation grid up to the top of the bed. The representation of the temperature of the fluidised bed was usually represented by a gradient of temperature between the low temperature of the cooled fluidised gas entering into the bed through the fluidisation grid and the substantially constant temperature of the major part of the fluidised bed.

This is now contradicted by the Applicants findings as explained hereafter. Indeed, the Applicants have found some critical temperature non-homogeneity across the fluidised polymer bed. This finding has been made possible thanks to the development of simulation models, using Computational Fluid Dynamic ("CFD") tools, which results have been validated by experimental and industrial data as explained hereafter.

The computation Fluid Dynamic software uses first principle equations (such as Navier Stokes equations) resolved with finite elements calculations to simulate the fluid dynamic behaviour in a fluidised bed polymerisation reactor. The hydrodynamic in the fluidised bed has been validated by experimental data on velocity profile of individual polymer particles in a fluidised bed as measured by positron emission tracking (PET) technique. A reference to this PET technique can be found in http://www.np.ph.bham.ac.uk/pic/pept. Subsequently the simulation software has incorporated heat transfer into the calculation to generate temperature profiles in the fluidised bed. These profiles have been compared and validated with actual temperature profiles in industrial plants.

Figure 2:
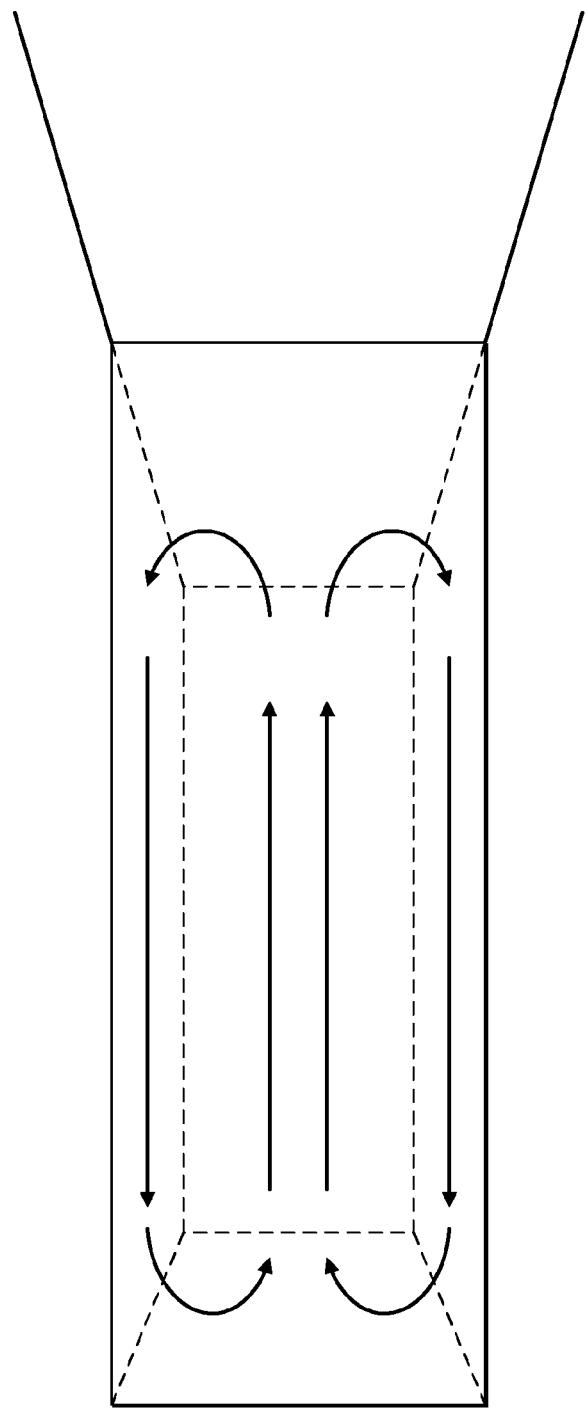
FIG. 2 shows an intense circulation loop of solid and gas in a fluidised bed polymerisation reactor, with an upstream flow in the center and a downstream flow at the periphery of the reactor.

The result of these calculations have demonstrated that there is an intense circulation loop of solid and gas in a fluidised bed polymerisation reactor, with an upstream flow in the center and a downstream flow at the peripheral of the reactor as shown in FIG. 2. Throughout extensive experience and accumulated knowledge, the Applicants have concluded that this circulation loop is a single loop with a circulation velocity which is a multiple of the fluidisation velocity. The Applicants have further discovered that the intensity of the internal circulation is proportional to the fluidization velocity. This large circulation plays a fundamental role in the homogeneity of the fluid bed reactor. The higher the circulation is, the lower are the temperature differences in different locations of the reactor, for a given production rate.

The temperature profiles in a fluid bed reactor have been simulated by the CFD software. It highlights, in the bottom of the reactor, a low temperature zone, immediately above the grid, and elevating through the center, as the result of the ingress of cold gas flow, or gas and liquid flow (when liquid is introduced below the fluidisation grid) through the fluidization grid. However, very quickly above the grid, the gas flow is thoroughly mixed with a very large solids and gas flow recirculation in the reactor which decreases drastically the difference between the local temperature and the average polymerisation temperature. As a result, the Applicants have observed a central zone where the temperature is slightly increasing when going up in the bed, and reversely a peripheral zone, where the temperature increases when going down along the wall. This temperature profile highlights a maximum temperature difference typically between the central zone and the peripheral zone of the reactor in approximately the bottom third of the reactor.

The Applicants have discovered that, when they were operating their large polymerisation reactors under more stringent conditions as defined in the present invention, an exponential generation of agglomerates and sheeting was taking place, likely due to the higher temperature difference across the fluidised bed and to the less steady operating conditions occurring in the reactor. As a result of this finding, the Applicants have surprisingly found that there is an excellent correlation between this maximum temperature difference and the value of the variable DT used in the present invention.

As already indicated, this correlation becomes relevant for large size reactors (i.e. reactors diameters above 4 m and having a reactor first volume of at least 250 m$^3$). Whilst not wishing to be bound by this theory, the Applicants believe that the inhomogeneity in said reactors tends to suddenly increase exponentially when the volume to surface ratio and/or the volume of the reactor increases because of the decrease in intensity of the turbulent regime (Reynolds number).

Thus, according to an embodiment of the present invention, the Applicants have discovered that in order to stay within a stable operating zone, the variable DT is maintained below 2.5; the variable DT is preferably maintained below 2.4, more preferably below 2.3 in order to guarantee some safety margin for the operations of the fluidised bed polymerisation reactors contemplated herein. According to an additional embodiment of the present invention, the variable DT is maintained above 0.5, preferably above 1.

The maintenance in DT can be accomplished by different means, e.g.:
- lower production rate for a given reactor volume (low STY), and/or
- higher fluidization velocity, and/or
- lower the reactor height.

However, these means of maintaining good homogeneity may sometimes be contradictory with the industry trend which is to increase reactor size, and capacity. Therefore there is an interest in finding additional alternative means to keep temperature homogeneity in the reactor.

In most fluid bed polymerisation reactors, the cooling of the polymerisation is accomplished by feeding through the grid a large flow of cold gas, and in complement, an amount of liquid. Recently, with increasing line capacities, the percentage of cooling obtained by the vaporisation of this liquid in the fluid bed has reached considerable amount i.e. 40% or more, with a liquid to gas ratio reaching 15% or more.

In some other reactor configurations, the liquid is injected at least partially into the bed usually in the bottom section of the reactor within a short distance of the grid. In both cases, the amount of cooling added to the fluid bed is located in the bottom of the reactor. Therefore, the cooling means are centralized in a restricted zone of the reactor.

As evidenced by the CFD model, this cooling is transferred to the large recirculation flow of solids and gas in the central part of the reactor, and the polymerisation heat is transferred progressively to the recirculation flow along the internal loop, continuously increasing the temperature until the recirculated solids reach the bottom peripheral zone of the fluid bed.

This configuration is not favorable to good temperature homogeneity in the bed, particularly at high space time yield ("STY"). As illustrated in comparative example 3, the temperature difference can easily exceed 3 degrees C. between the hot zones and the cold zones of the reactor.

On the other hand, it has been observed, surprisingly, that adequate cooling split, by liquid injection in different zones of the fluid bed could significantly increase the temperature homogeneity, even at very high STY.

Thus, an additional embodiment of the present invention relates to a process for the continuous gas-phase (co-) polymerisation of olefins in a vertical fluidised bed reactor having a first volume of at least 250 m$^3$ and a fluidisation grid at the bottom of the fluidised bed, said process being operated with a condensation rate higher than 15 wt % in the presence of a polymerisation catalyst and with a space time yield equal or higher than 120 kg/(m$^3$×h), and characterised in that the operations are controlled by reintroducing all the liquid directly into the fluidised bed, i.e. at locations which are not below the bottom of the fluidised bed (e.g. below the fluidisation grid).

Whilst the model is providing a huge improvement in the management of stable operations of fluidised beds at high STY and large scale reactors, the Applicants have further discovered an additional embodiment according to the present invention which consists in the introduction of some of the liquid at the bottom of the fluidised bed whilst maintaining said amount of liquid below a critical concentration level.

Indeed, by applying this additional embodiment, the Applicants have discovered that they could not only operate in a stable manner but also produce polymers exhibiting homogeneous melt index and density.

Thus, another embodiment of the present invention relates to a process for the continuous gas-phase (co-) polymerisation of olefins in a vertical fluidised bed reactor having a first volume of at least 250 m$^3$ and a fluidisation grid at the bottom of the fluidised bed, said process being operated with a condensation rate higher than 15 wt % in the presence of a polymerisation catalyst and with a space time yield equal or higher than 120 kg/(m$^3$×h), and characterised in that the operations are controlled by reintroducing the liquid partly below the fluidised bed through the fluidisation grid and partly directly into the fluidised bed, wherein the weight ratio (X) between the liquid introduced directly in the fluidised bed above the fluidisation grid and the total liquid introduced into the reactor is greater than 1%.

Said weight ratio X can advantageously be greater than 5%, greater than 10%, greater than 25%, greater than 50% or even greater than 75%. Said weight ratio X can advantageously be lower than 99%, lower than 95%, lower than 90% or even lower than 85%.

X is thus the weight ratio between the liquid introduced directly in the fluidised bed above the fluidisation grid and the total liquid introduced into the reactor. For example, when all the liquid introduced into the reactor is directly introduced into the fluidised bed, X equals 1; similarly, when all the liquid introduced into the reactor is directly introduced below the fluidisation grid, X equals 0).

According to an additional embodiment of the present invention, at least 50% of the liquid which is reintroduced directly into the fluidised bed is preferably reintroduced at a height which is equal to or above 0.7 m above the fluidisation grid, preferably equal to or above 1 m above said grid; preferably, part or all of this liquid is reintroduced at a height which is comprised between (¼H and ¾H).

According to an additional embodiment of the present invention, the liquid reintroduced directly into the fluidised bed is preferably reintroduced at a height lower than 0.9H.

According to an additional embodiment of the present invention, the liquid reintroduced directly into the fluidised bed is preferably not reintroduced at a location close to the polymer withdrawal(s).

For the purpose of the present invention and appended claims, when condensed liquid is introduced directly into the fluidised bed, it is essential that this introduction is not performed by a direct passage. By "not performed by a direct passage", the Applicants mean that the condensed liquid, before its introduction into the fluidised bed, has to go through a mechanical equipment. For example, such equipment can be selected amongst pump and/or compressor and/or atomiser and/or separator. According to a preferred embodiment of the present invention, the pressure of the liquid before its injection into the bed is higher than the pressure at the point of entry of the recycle gas into the reactor; preferably at least 1 bar higher, more preferably at least 2 bars, e.g. 5 bars or even 9 bars higher than the pressure at the point of entry of the recycle gas into the reactor.

For the purpose of the present invention and appended claims, the space time yield ("STY") expressed in terms of weight of polymer produced per unit volume of reactor space per unit time is of at least 120 kg/(m$^3$×h). Said STY can advantageously be higher than 150 kg/(m$^3$×h) and even higher than 200 kg/(m$^3$×h).

According to the present invention, the production rate of the polymer is of at least 30 tons per hour, e.g. at least 40 tons per hour or even at least 50 tons per hour.

According to the present invention, the continuous gas-phase (co-) polymerisation of olefins is operated with a condensation rate higher than 15 wt %. For the purpose of the present invention and appended claims, this means that the claimed process is operated by introducing a gaseous stream of polymerizable monomer(s) into the fluidized bed reactor to produce the desired (co-) polymer, by removing an outlet stream comprising gaseous unreacted polymerizable monomer(s) from said fluidized bed reactor, by cooling at least a part of the outlet stream to a temperature at which liquid condenses out of the outlet stream and by recycling at least part of the cooled outlet stream, characterised in that the liquid recycled to the reactor represents more than 15 percent by weight of the total weight of the recycle stream at the exit of the reactor. The condensation rate is thus the ratio (expressed in %) of the weight of liquid recycled to the reactor to the total weight of the recycle stream at the exit of the reactor.

According to an additional embodiment of the present invention, said liquid phase can advantageously be equal to or represent more than 17.5 percent, 20 percent, or even 25 percent by weight of the total weight of the stream recycled to the reactor.

According to an additional embodiment of the present invention, said liquid phase can advantageously represent less than 60 percent, or even less than 50 percent by weight of the total weight of the stream recycled to the reactor.

As indicated hereinbefore, the man skilled in the art has developed several tools for measuring and/or calculating the condensation rate.

The Applicants have advantageously used the software Aspen Plus 2004, Version 2004.1 (13.2.0.2925) from Aspen Technology, Inc. (Cambridge, Mass., U.S.A.) for determining the condensation rate. In particular, said condensation rate is obtained thanks to a thermodynamic equilibrium calculation, known as "flash", which uses the Peng Robinson Boston Mathias modified equation of state which is available in the above Aspen software.

For example, when the recycle loop comprises only one heat exchanger, the flash calculation is performed at the pressure and temperature conditions which prevails at the exit of said exchanger, i.e. at the location where the gas/liquid mixture is perfectly representative of the products (and their properties) which are recycled to the reactor.

It is obvious for the man skilled in the art to adapt his calculation of the condensation rate to the specific circumstances, e.g. to the specific recycle design used in his operations. For example, if the recycle stream is divided into two streams which are respectively subjected to separate heat exchangers where the condensation occurs, the man skilled in the art knows how to calculate the actual condensation rate. Similarly, potential by-passes and/or exchangers in series and/or reheaters of the recycle stream will have to be taken into account by the man skilled in the art for the calculation of the condensation rate.

The process of the present invention is operated with a gas velocity in the fluidised bed which must be greater than or equal to that required for fluidisation of the bed. The minimum gas velocity is generally approximately 10 cm/sec but the process of the present invention is preferably carried out using a gas velocity greater than 40 cm/sec or even greater than 50 cm/sec. By controlling the homogeneity of the fluidized bed reactor according to the present invention, the Applicants have unexpectedly found that fluidisation velocities comprised between 70 cm/sec and 80 cm/sec could advantageously be used. Velocities of one meter per second and even beyond have been also demonstrated by using computer simulation models.

Examples of gas phase fluidised-bed reactors in which the present invention can advantageously apply include EP 0 475 603, EP 1 240 217, EP 1 484 344 and EP 0 855 411.

In such processes, the particles of polymer being formed are maintained in the fluidised state by virtue of a reaction gas mixture containing the monomer(s) to be polymerised travelling in a rising stream. The polymer thus manufactured in powder form is generally drained from the reactor in order to keep the bed of fluidised polymer particles at a more or less constant volume. The process generally employs a fluidisation grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidisation grid by means of an external circulation conduit.

The polymerisation of the olefins is an exothermic reaction. The reaction mixture comprising the olefins to be polymerised is generally cooled by means of at least one heat exchanger arranged on the outside of the reactor before being recycled. Liquid, especially but not limited to liquid condensed from the cooled reaction mixture during recycle, may be injected into the reaction zone. Vaporisation of the liquid in the reaction zone provides the effect of cooling directly in the reaction zone.

The principal olefin is preferably selected from olefins having 2 to 6 carbon atoms such as ethylene, propylene, 1-butene, 1-hexene and 4-methyl-1-pentene, and more preferably is ethylene or propylene.

Comonomer olefins, where present, are preferably selected from olefins having 2 to 12 carbon atoms. Suitable comonomer olefins are ethylene, propylene, 1-butene, 1-hexene, 4-methyl-1-pentene and 1-octene. Preferably, the principal olefin is ethylene or propylene and the comonomer is ethylene, propylene, 1-butene, 1-hexene or 1-octene. More preferably, the olefin is ethylene and the comonomer is 1-butene, 1-hexene or 1-octene, preferably 1-hexene or 1-octene.

The reaction mixture may also comprise one or more inert compounds, especially inert gases such as nitrogen, and/or one or more saturated hydrocarbons such as ethane, propane, butane, pentane and hexane.

The method according to the present invention may be used to prepare a wide variety of polymer products, preferably polyethylene or polypropylene. Polyethylenes are the preferred products, and the most preferred product is linear low density polyethylene (LLDPE), especially based on copolymers of ethylene with 1-butene, 1-hexene or 1-octene. This method is particularly suitable for the production of very low density polyethylene (VLDPE). A further suitable polyethylene product is high density polyethylene (HDPE), especially copolymers of ethylene with a small portion of higher alpha olefin, for example, 1-butene, 1-pentene, 1-hexene or 1-octene.

The method is particularly suitable for polymerising olefins in the gas phase at an absolute pressure of between 0.5 and 6 MPa and at a temperature of between 30° C. and 130° C. For example, for LLDPE production the temperature is suitably in the range 75-100° C. and for HDPE the temperature is typically 80-115° C. depending on the activity of the catalyst used and the polymer properties desired.

The total pressure in the gas phase polymerisation reactor is most preferably between 1.5 and 3 MPa.

The method of the present invention may be applied to polymerisation processes using any suitable polymerisation catalyst, including Ziegler-Natta type catalysts chromium oxide type catalysts, and metallocene type catalysts.

The copolymerisation may therefore be carried out, for example, in the presence of a catalyst of Ziegler-Natta type comprising at least one transition metal in combination with a cocatalyst comprising an organometallic compound, for example an organoaluminium compound. The catalyst essentially comprises an atom of a transition metal selected from the metals of groups IV to VI of the periodic classification of the elements, such as titanium, vanadium, chromium, zirconium or hafnium, optionally a magnesium atom and a halogen atom. The catalyst may be supported on a porous refractory oxide such as silica or alumina or may be combined with a solid magnesium compound, such as the chloride, the oxide, the hydroxy chloride or an alcoholate of magnesium. By way of example, mention may be made of the catalysts described in the patents U.S. Pat. No. 4,260,709, EP 0 598 094, EP 0 099 774 and EP 0 175 532. The present invention is also particularly appropriate for silica-supported Ziegler catalysts, for example those described in Patents WO 93/09147, WO 95/13873, WO 95/34380, WO 99/05187 and U.S. Pat. No. 6,140,264. The catalyst can be used as it is or optionally in the form of a coated catalyst or prepolymer containing, for example, from $10^{-5}$ to 3, preferably from $10^{-3}$ to $10^{-1}$, millimoles of transition metal per gram of polymer; it can be used together with a cocatalyst or activator, e.g. an organometallic compound of a metal from groups I to III of the Periodic Classification of the Elements, such as, for example, an organoaluminium compound. It is also possible to use a catalyst complexed by a metal selected from those of group VIII of the periodic classification of the elements, such as, for example, nickel, iron or cobalt. By way of examples, mention may be made of those described in Patent Application WO 98/27124 or WO 98/2638. It is also possible to use catalysts based on platinum or palladium as the transition metal; complexes of this type are described, for example, in the Patent WO 96/23010.

The copolymerisation may thus also be carried out in the presence of a chromium oxide catalyst. Examples of chromium oxide catalysts are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula $CrO_3$, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminium or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C. Such catalyst preferably contains from 0.05 to 5%, more preferably from 0.1 to 2%, by weight of chromium; it can contain, in addition to the chromium, from 0.1 to 10% of titanium in the form of titanium oxide and/or fluorine and/or aluminium, in particular in the form of aluminium oxide; it can be used as it is or optionally in the form of a coated catalyst or prepolymer containing, for example, from $10^{-5}$ to 3, preferably from $10^{-3}$ to $10^{-1}$, millimoles of chromium per gram of polymer. The chromium oxide catalysts may be used together with a cocatalyst or activator, e.g. an organometallic compound of a metal from groups I to III of the Periodic Classification of the Elements, such as, for example, an organoaluminium compound. Examples of catalysts can be found, for example, in EP 0 275 675, EP 0 453 116, or WO 99/12978.

The method of the present invention is also preferably applied to a polymerisation process in which the catalyst is a metallocene-type catalyst. In particular, the present invention has been found to provide significant improvements when used for such systems.

With regards to particular metallocene-type catalysts, mention may be made, by way of example, of those corresponding to the formula

where L is a bulky ligand; A is a leaving group, M is a transition metal and m and n are such that the total valency of the ligand corresponds to the valency of the transition metal.

The ligands L and A may be bridged. L is generally a ligand of the cyclopentadienyl type.

Examples of metallocene catalysts of this type are described in U.S. Pat. Nos. 4,530,914, 5,124,418, 4,808,561, 4,897,455, 5,278,264, 5,278,119, 5,304,614, and EP 0 129 368, EP 0 591 756, EP 0 520 732, EP 0 420 436, WO 91/04257, WO 92/00333, WO 93/08221, WO 93/08199.

It is also possible to use with advantage the metallocene-based catalyst systems as described in U.S. Pat. Nos. 4,871, 705, 4,937,299, 5,324,800, 5,017,714, 5,120,867, 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP 0 561 476, EP 0 279 586, EP 0 594 218, WO 94/10180 and WO 2006/085051.

Mention may also be made of the Patents WO 92/00333, WO 94/07928, WO 91/04257, WO 94/03506, U.S. Pat. Nos. 5,057,475, 5,096,867, 5,055,438, 5,198,401, 5,227,440, 5,264,405, EP-A-0 420 436, U.S. Pat. Nos. 5,604,802, 5,149, 819, 5,243,001, 5,239,022, 5,276,208, 5,296,434, 5,321,106, 5,329,031, 5,304,614, WO 93/08221, WO 93/08199 and EP 0

578 838. The preferred transition metal compounds of the catalyst are those of group 4, in particular zirconium, titanium and hafnium.

The metallocene catalyst may also be represented by the general formula (Cp)m MRnR'p, where Cp is a ring of the cyclopentadienyl type, M is a transition metal of group 4, 5 or 6; R and R' may be selected from halogens and hydrocarbyl or hydrocarboxyl groups; m=1-3, n=0-3, p=0-3 and the sum m+n+p equals the oxidation state of M; preferably, m=2, n=1 and p=1.

The metallocene catalyst may be also represented by the general formula (C5R'm)pR"s(C5R'm)MeQ3-p-x, or R"s(C5R'm)2MeQ' where Me is a transition metal of group 4, 5 or 6, at least one C5 R'm is a substituted cyclopentadienyl, each R', which may be identical or different, is hydrogen, an alkyl, alkenyl, aryl, alkylaryl or arylalkyl radical having 1 to 20 carbon atoms, or two carbon atoms linked together to form part of a substituted or unsubstituted ring having 4 to 20 carbon atoms, R" is a radical containing one or more or a combination of carbon, germanium, silicon, phosphorus or nitrogen atoms which bridges two rings (C5 R'm), or which bridges one ring (C5 R'm) to M, when p=0, x=1, else "x" is always 0, each Q, which may be identical or different, is an alkyl, alkenyl, aryl, alkylaryl or arylalkyl radical having 1 to 20 carbon atoms, a halogen or an alkoxide, Q' is an alkylidene radical having 1 to 20 carbon atoms, s is 0 or 1, and when s is 0, m is 5 and p is 0, 1 or 2 and when s is 1, m is 4 and p is 1.

The metallocene catalysts are generally used with an activator or cocatalyst. Examples which may be mentioned include alumoxane and/or ionic or neutral ionising activators, or compounds such as pentafluorophenyl tri(n-butyl)ammonium tetraborate or the boric metalloid precursor of trisperfluorophenyl, which ionises the neutral metallocene compound. Compounds of this type are described in EP 0 570 982, EP 0 520 732, EP 0 495 375, EP 0 426 637, EP 0 500 944, EP 0 277 003, EP 0 277 004, U.S. Pat. Nos. 5,153,157, 5,198,401, 5,066,741, 5,206,197 and 5,241,025, and WO 94/07928.

Catalyst combinations may also be used, for example those described in U.S. Pat. Nos. 5,281,679, 4,701,432, 5,124,418, 5,077,255 and 5,183,867.

Other examples of metallocene catalysts are described in Patents EP 0 593 083, U.S. Pat. Nos. 5,317,036, 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, WO 95/10542, WO 95/07939, WO 94/26793 and WO 95/12622.

Preferably, the metallocene comprises
A) an inert support,
B) a group 4-10 metal complex corresponding to the formula:

where M is a metal of one of groups 4 to 10 of the Periodic Table of the Elements,
Cp is an anionic ligand group,
Z is a divalent moiety linked to Cp and linked to M, comprising boron or an element of group 14 of the Periodic Table of the Elements, and further comprising nitrogen, phosphorus, sulphur or oxygen;

X is a neutral conjugated diene ligand group having up to 60 atoms, or a dianionic derivative, and
C) an ionic cocatalyst capable of converting the metal complex into an active polymerisation catalyst.

Examples of cocatalysts are described in U.S. Pat. Nos. 5,132,380, 5,153,157, 5,064,802, 5,321,106, 5,721,185 and 5,350,723. Mention may also be made of the complexes described in WO 96/28480 and WO 98/27119.

The catalyst may be used in the form of a prepolymer prepared beforehand during a prepolymerisation step from catalysts described above. The prepolymerisation may be carried out by any process, for example a prepolymerisation in a liquid hydrocarbon or in gas phase in accordance with a batchwise, semicontinuous or continuous process.

The catalyst or the prepolymer may be introduced into the reactor continuously or discontinuously.

EXAMPLES

As indicated hereinbefore, the Applicants have developed a CFD model which has been validated respectively by their industrial experience.

Said model is based on heat and mass balance in a multitude of homogeneous zones coupled with an internal recirculation of solids and gas between these zones.

This model shows the existence of a very cold zone above the grid limited to a distance approximately located between 0.3 m and 0.7 m above the grid. We have observed that injecting liquid in this zone or below the grid have about the same effect in terms of temperature inhomogeneity in the reactor. In addition, when the quantity of liquid, added below the grid or just above the grid, is high, the liquid separates from the gas and creates inhomogeneity in the gas liquid mixture. This creates heavy disturbance of the fluidisation in the fluid bed, as well as a higher temperature inhomogeneity in the fluid bed. For instance, when the STY is high, the maximum temperature difference between the max temperature of the fluid bed and the outlet temperature of the gas can reach 3.4 degree C. (comparative example 3). Additionally, by experience, we have discovered that when this temperature difference exceeds 2.5 degree C., agglomerates and sheeting occur.

The tables 2 and 3 below are illustrative of such findings.

The first row indicates the STY—Space Time Yield expressed in [kg/(m³×h)].

The second row gives the value of our parameter DT.
The third row is Z, the condensation rate expressed in wt %.
The fourth row is X, the weight ratio between the liquid introduced directly in the fluidised bed above the fluidisation grid and the total liquid introduced into the reactor.

TABLE 1

| reactor diameter (D) | m | 5 |
| fluidization velocity (Vf) | m/s | 0.75 |
| reactor height (H) | m | 20 |

TABLE 2

| Example | C1 | C2 | C3 | 4 |
|---------|------|--------|--------|--------|
| STY     | 76.39 | 114.59 | 165.52 | 165.52 |
| DT      | 1.57 | 2.36   | 3.41   | 1.77   |
| Z (wt %) | 7   | 15     | 30     | 30     |
| X       | 0    | 0      | 0      | 1      |

From the DT values calculated respectively in comparative examples 1, 2 and 3, it can be seen that, when all the condensed liquid is introduced below the fluidisation grid, the bed behaviour tends to evolve very quickly towards a non homogeneous mode when the STY and Z parameters increase.

In example 4, we have controlled the process by diverting the condensed liquid which has been entirely introduced directly into the peripheral zone of the fluidised bed, at a height which is located 1.5 m above the fluidisation grid.

TABLE 3

| Example | 5 | 6 | 7 | C8 |
|---|---|---|---|---|
| STY | 190.99 | 190.99 | 190.99 | 190.99 |
| DT | 1.73 | 1.73 | 2.27 | 2.83 |
| Z (wt %) | 35 | 35 | 35 | 35 |
| X | 1 | 1 | 0.75 | 0.5 |

In all the examples of table 3, the condensed liquid which has been introduced directly into the bed was introduced in the peripheral zone of the fluidised bed at a height which is comprised between (¼H and ¾H).

Example 7 is representative of a particular embodiment of the present invention where a percentage of the liquid is introduced below the fluidisation grid. As depicted in comparative example C8, if the split between the introduction of the liquid below and above the grid is not carefully controlled, the bed can rapidly enter into a non homogeneous mode.

The invention claimed is:
1. Process for the continuous gas-phase (co-) polymerisation of olefins in a vertical fluidised bed reactor having a first volume of at least 250 m³, wherein D and V are respectively the diameter and the volume of the first volume of the reactor, and H is the height of the first volume of the reactor, being the distance between a fluidization grid at the bottom of the fluidized bed and the top of the first volume of the reactor, wherein the diameter D is at least 4 meters and the ratio H/D is higher than 3.75, said process being operated with a condensation rate higher than 15 wt %, in the presence of a polymerisation catalyst and with a space time yield equal or higher than 120 kg/(m³×h), and wherein the operations are controlled in order to maintain the parameter DT below 2.5, wherein

$$DT = (1 - 0.016 * Z * X) * \frac{K * STY * H * \text{Heat } Polym}{3600 * Vf * Rho\ PE * Cp\ PE}$$

where:
Z is the condensation rate expressed in wt %,
X is the weight ratio between the liquid introduced directly in the fluidised bed above the fluidisation grid and the total liquid introduced into the reactor,
K is a dimensionless calibration factor equal to 1.46,
STY is the Space Time Yield expressed in [kg/(m³×h)],
H is the distance between the bottom of the fluidised bed and the top of the first volume of the reactor (expressed in meter),
Heat Polym is the heat of polymerisation expressed in Kcal/kg Polymer
Vf is the fluidization velocity of the fluidising gas (expressed in m/s),
Rho PE is the polymer powder density expressed in Kg/m³, and
Cp PE is the heat capacity of the solid polymer expressed in Kcal/kg·C.

2. Process according to claim 1 wherein DT is maintained below 2.4.

3. Process for the continuous gas-phase (co-) polymerisation of olefins in a vertical fluidised bed reactor having a first volume of at least 250 m³ and a fluidisation grid at the bottom of the fluidised bed, said process being operated with a condensation rate higher than 15 wt % in the presence of a polymerisation catalyst and with a space time yield equal or higher than 120 kg/(m³×h), wherein the operations are controlled by reintroducing all the liquid directly into the fluidised bed, and wherein at least 50% of the liquid which is reintroduced directly into the fluidized bed is introduced at a height which is equal to or above 1 m above the fluidization grid.

4. Process for the continuous gas-phase (co-) polymerisation of olefins in a vertical fluidised bed reactor having a first volume of at least 250 m³ and a fluidisation grid at the bottom of the fluidised bed, said process being operated with a condensation rate higher than 15 wt % in the presence of a polymerisation catalyst and with a space time yield equal or higher than 120 kg/(m³×h), wherein the operations are controlled in order to maintain the polyolefin fluidised bed under homogeneous conditions by reintroducing the liquid partly below the fluidised bed through the fluidisation grid and partly directly into the fluidised bed, wherein the weight ratio (X) between the liquid introduced directly in the fluidised bed above the fluidisation grid and the total liquid introduced into the reactor is greater than 25%, and wherein at least 50% of the liquid which is reintroduced directly into the fluidized bed is introduced at a height which is equal to or above 1 m above the fluidization grid.

5. Process according to claim 1 wherein X is greater than 25%.

6. Process according to claim 1 wherein X is lower than 95%.

7. Process according to claim 1 wherein at least 50% of the liquid which is reintroduced directly into the fluidised bed is introduced at a height which is equal to or above 0.7 m above the fluidisation grid.

8. Process according to claim 1 wherein at least 50% of the liquid which is reintroduced directly into the fluidised bed is introduced at a height which is comprised between ¼H and ¾H.

9. Process according to claim 1 wherein the liquid reintroduced directly into the fluidised bed is introduced at a height lower than 0.9H.

10. Process according to claim 1 wherein the real height of the fluidized bed (h) is equal or higher than 0.85×H.

11. Process according to claim 1 wherein the real height of the fluidised (h) bed is equal or lower than 1.15×H.

12. Process according to claim 1 wherein the first volume of the reactor is at least 270 m3.

13. Process according to claim 1 wherein the first volume of the reactor is a cylinder.

14. Process according to claim 1 wherein the fluidized bed occupies at least 80% of the first volume of the reactor.

15. Process according to claim 1 wherein the fluidized bed occupies less than 120% of the first volume of the reactor.

16. Process according to claim 1 wherein the diameter D of the first volume of the reactor is at least 4.3 meters.

17. Process according to claim 1 wherein the diameter D of the first volume of the reactor is lower than 6 meters.

18. Process according to claim 1 wherein the ratio H/D of the reactor first volume is higher than 3.90.

19. Process according to claim 1 wherein the ratio H/D of the reactor first volume is lower than 5.

20. Process according to claim 1 wherein the condensation rate is equal or more than 17.5 weight percent.

21. Process according to claim 1 wherein the condensation rate is less than 60 percent.

22. Process according to claim 1 wherein the space time yield ("STY") is higher than 150 kg/(m$^3$×h).

23. Process according to claim 1 wherein the production rate of the polymer is of at least 30 tons per hour.

24. Process according to claim 1 wherein the fluidisation gas velocity is comprised between 70 and 80 cm/sec.

25. Process according to claim 3 wherein at least 50% of the liquid which is reintroduced directly into the fluidised bed is introduced at a height which is comprised between ¼H and ¾H.

26. Process according to claim 3 wherein the real height of the fluidized bed (h) is equal or higher than 0.85×H.

27. Process according to claim 3 wherein the real height of the fluidised (h) bed is equal or lower than 1.15×H.

28. Process according to claim 3 wherein the first volume of the reactor is at least 270 m3.

29. Process according to claim 3 wherein the first volume of the reactor is a cylinder.

30. Process according to claim 3 wherein the condensation rate is equal or more than 17.5 weight percent.

31. Process according to claim 3 wherein the condensation rate is less than 60 percent.

32. Process according to claim 3 wherein the space time yield ("STY") is higher than 150 kg/(m$^3$×h).

33. Process according to claim 3 wherein the production rate of the polymer is of at least 30 tons per hour.

34. Process according to claim 4 wherein X is greater than 50%.

35. Process according to claim 4 wherein X is lower than 95%.

36. Process according to claim 4 wherein at least 50% of the liquid which is reintroduced directly into the fluidised bed is introduced at a height which is comprised between ¼H and ¾H.

37. Process according to claim 4 wherein the real height of the fluidized bed (h) is equal or higher than 0.85×H.

38. Process according to claim 4 wherein the real height of the fluidised (h) bed is equal or lower than 1.15×H.

39. Process according to claim 4 wherein the first volume of the reactor is at least 270 m3.

40. Process according to claim 4 wherein the first volume of the reactor is a cylinder.

41. Process according to claim 4 wherein the condensation rate is equal or more than 17.5 weight percent.

42. Process according to claim 4 wherein the condensation rate is less than 60 percent.

43. Process according to claim 4 wherein the space time yield ("STY") is higher than 150 kg/(m$^3$×h).

44. Process according to claim 4 wherein the production rate of the polymer is of at least 30 tons per hour.

45. Process according to claim 1 wherein at least 50% of the liquid which is reintroduced directly into the fluidized bed is introduced at a height which is equal to or higher than 1 m above the fluidization grid.

46. Process according to claim 1 wherein the diameter D of the first volume of the reactor is at least 4.5 meters.

* * * * *